US006963461B2

(12) United States Patent
Margulies et al.

(10) Patent No.: US 6,963,461 B2
(45) Date of Patent: *Nov. 8, 2005

(54) METHOD FOR MAGNETIC RECORDING ON LAMINATED MEDIA WITH IMPROVED MEDIA SIGNAL-TO-NOISE RATIO

(75) Inventors: David T. Margulies, Los Gatos, CA (US); Andreas Moser, San Jose, CA (US); Hal J. Rosen, Los Gatos, CA (US); Jan-Ulrich Thiele, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 186 days.

This patent is subject to a terminal disclaimer.

(21) Appl. No.: 10/620,664

(22) Filed: Jul. 15, 2003

(65) Prior Publication Data

US 2005/0013034 A1    Jan. 20, 2005

(51) Int. Cl.$^7$ ................................................ G11B 5/02
(52) U.S. Cl. ................ 360/59; 360/135; 428/694 TM; 428/694 MM; 369/13.38
(58) Field of Search ...................... 360/55, 59, 131, 360/135; 428/694 BM, 694 BP, 694 TM, 428/694 TP, 694 MM, 694 EC, 694 IS; 369/13.25, 369/13.01, 300, 13.02, 13.14, 13.24, 13.35, 369/13.38, 13.39, 13.41, 13.4, 13.42, 13.51, 369/13.43, 13.44, 13.48, 13.49

(56) References Cited

U.S. PATENT DOCUMENTS

| 5,051,288 A | 9/1991 | Ahlert et al. |
| 5,583,727 A | 12/1996 | Parkin |
| 5,986,978 A | 11/1999 | Rottmayer et al. |
| 6,280,813 B1 | 8/2001 | Carey et al. |
| 6,493,183 B1 | 12/2002 | Kasiraj et al. |
| 2002/0098390 A1 * | 7/2002 | Do et al. ................ 428/694 TS |
| 2002/0192506 A1 * | 12/2002 | Coffey et al. ......... 428/694 TM |
| 2003/0021191 A1 | 1/2003 | Hsu et al. |
| 2005/0013033 A1 * | 1/2005 | Margulies et al. ............ 360/59 |

OTHER PUBLICATIONS

S. E. Lambert, et al., "Reduction of Media Noise in Thin Film Metal Media by Lamination", IEEE Transactions on Magnetics, vol. 26, No. 5, Sep. 1990, pp. 2706-2709.
D. Weller et al., "High Ku materials approach to 100 Gbits/in2", IEEE Transactions on Magnetics, vol. 36, Issue 1, Jan. 2000, pp 10-15.
"Data Recording at Ultra High Density", IBM Technical Disclosure Bulletin, vol. 39, No. 7, Jul. 1996, p. 237.
"Thermally-Assisted Magnetic Recording", IBM Technical Disclosure Bulletin, vol. 40, No. 10, Oct. 1997, p. 65.

* cited by examiner

*Primary Examiner*—Alan T. Faber
(74) *Attorney, Agent, or Firm*—Thomas R. Berthold

(57) ABSTRACT

A magnetic recording disk drive has an inductive write head and a heater to record data in laminated media on the recording disk. The laminated media, with at least two ferromagnetic layers separated by a nonmagnetic spacer layer, improves SNR. Each of the ferromagnetic layers can be formed of a material having an intrinsic coercivity capable of being written by a conventional inductive write head, but because of the desired lamination to increase SNR, the ferromagnetic layer farthest from the write head is exposed to a magnetic field less than its intrinsic coercivity and thus can not be written. To write to the laminated media, heat is directed to the lower ferromagnetic layer to reduce its intrinsic coercivity below the magnetic field to which it is exposed.

5 Claims, 4 Drawing Sheets

METHOD FOR MAGNETIC RECORDING ON LAMINATED MEDIA WITH IMPROVED MEDIA SIGNAL-TO-NOISE RATIO

RELATED APPLICATION

This application is related to concurrently filed application U.S. Ser. No. 10/620,542 titled "MAGNETIC RECORDING DISK DRIVE WITH LAMINATED MEDIA AND IMPROVED MEDIA SIGNAL-TO-NOISE RATIO" which is based on the same specification as this application, and now published as U.S. 20050013033 A1.

TECHNICAL FIELD

This invention relates generally to magnetic recording disk drives, and more particularly to a magnetic recording disk drive with increased recording density as a result of improved media signal-to-noise ratio (SNR).

BACKGROUND OF THE INVENTION

In magnetic recording disk drives, where the magnetic recording media on the disks is a granular metal alloy, such as a CoPt alloy, the intrinsic media noise increases with increasing linear recording density. Media noise arises from irregularities in the recorded magnetic transitions and results in random shifts of the readback signal peaks. Higher media noise leads to higher bit error rates. Thus to obtain higher areal densities in magnetic recording disk drives, it is necessary to decrease the intrinsic media noise, i.e., increase the signal-to-noise ratio (SNR), of the recording media.

The media SNR is to first order proportional to $20 \log(N^{1/2})$, where N is the number of magnetic grains per unit area in the media and SNR is expressed in units of dB. Accordingly, increases in SNR can be accomplished by increasing N. However, N is limited by the individual grain area A required to maintain the thermal stability of the recorded magnetization. This limitation arises because the energy term protecting against thermal degradation is KV, where K is the anisotropy and V is the volume of an individual magnetic grain. KV must be kept greater than a certain value to assure thermal stability of the recorded magnetizations. Increasing N by merely reducing the grain area A will reduce V since V=At, where t is the grain height (i.e., the thickness of the magnetic recording layer), and this will reduce KV, leading to thermal instability. One approach to prevent this problem is to proportionally increase the anisotropy K as V is decreased. However, this approach is limited by the available magnetic write field produced by the recording head. The magnetic field necessary to write the media (i.e., change the recorded magnetizations) is represented by the short-time or intrinsic coercivity $H_0$ of the media, which is proportional to K/M, where M is the grain magnetization or magnetic moment. Therefore, increasing K will increase $H_0$ and may prevent the media from being able to be written by a conventional recording head. In summary, to ensure reliable operation of a magnetic recording disk drive the media must have sufficiently high SNR, sufficiently low $H_0$ to be writable, and sufficiently high KV to be thermally stable.

Improved media SNR can be achieved with "laminated" media. In laminated media, the single magnetic layer is replaced with a laminate of two or more separate magnetic layers that are spaced apart and magnetically decoupled by nonmagnetic spacer layers. This discovery was made by S. E. Lambert, et al., "Reduction of Media Noise in Thin Film Metal Media by Lamination", IEEE Transactions on Magnetics, Vol. 26, No. 5, Sep. 1990, pp. 2706–2709, and patented in U.S. Pat. No. 5,051,288. This approach increases SNR because N is increased, e.g., essentially doubled when the laminated magnetic layer contains two magnetic layers. In this approach the same magnetic alloy composition that was used in the single magnetic layer is used in both magnetic layers of the laminated magnetic layer, so that it is not necessary to use a higher K magnetic alloy material. Thus K remains the same as for the single layer media, i.e., each magnetic layer has an intrinsic coercivity $H_0$ capable of being written by a conventional write head. If each magnetic layer in the laminate is also the same thickness as the single magnetic layer the grain volume V remains the same because the grains in the two magnetic layers are magnetically decoupled by the nonmagnetic spacer layer. Thus SNR is increased without a reduction in KV so that thermal stability is not decreased. However, this laminated media approach to increasing media SNR requires substantially thicker media, e.g., a doubling of the total magnetic layer thickness to increase SNR by approximately 3 dB. However, a different problem arises by doubling the thickness of the magnetic layer, namely a degradation in overwrite (OW), which is a measure of how well a second signal can be recorded over a previously written signal. Low OW is undesirable because it means that a larger amount of the original signal remains after it is overwritten by the second signal. Even though the magnetic material in the laminated layer is capable of being written by a conventional write head, low OW occurs in laminated media because the write field decreases with distance from the write head and thus the strength of the write field is less at the bottom magnetic layer than at the top magnetic layer.

Media SNR can also be improved by thermally-assisted magnetic recording (TAMR), wherein a high K magnetic recording layer is heated locally during writing to near the Curie temperature of the magnetic material. In this approach the single magnetic layer having a KV value is replaced with a single magnetic layer of a different alloy composition. This different alloy has smaller grains to thereby increase N, but also a higher anisotropy K. Because the higher K material has a higher $H_0$, it can not be written by a conventional write head and thus the magnetic material must be heated to lower the intrinsic coercivity enough for writing to occur. Several approaches for heating the high K media in TAMR have been proposed, including use of a laser beam or ultraviolet lamp to do the localized heating, as described in "Data Recording at Ultra High Density", IBM Technical Disclosure Bulletin, Vol. 39, No. 7, July 1996, p. 237; "Thermally-Assisted Magnetic Recording", IBM Technical Disclosure Bulletin, Vol. 40, No. 10, October 1997, p. 65; and U.S. Pat. No. 5,583,727. A read/write head for use in a TAMR system is described in U.S. Pat. No. 5,986,978, wherein a special optical channel is fabricated adjacent to the pole or within the gap of a write head for directing laser light or heat down the channel. U.S. Pat. No. 6,493,183 describes a TAMR disk drive wherein the thin film inductive write head includes an electrically resistive heater located in the write gap between the pole tips of the write head for locally heating the high K magnetic recording layer.

What is needed is a magnetic recording disk drive with thermally stable, high SNR media that has high OW.

SUMMARY OF THE INVENTION

In the present invention a magnetic recording disk drive has an inductive write head and a heater to record data in laminated media on the recording disk. The laminated media, with at least two ferromagnetic layers separated by a nonmagnetic spacer layer, improves SNR. Each of the ferromagnetic layers can be formed of a material having an intrinsic coercivity capable of being written by a conventional inductive write head, but because of the desired lamination to increase SNR, the ferromagnetic layer farthest from the write head is exposed to a magnetic field less than its intrinsic coercivity and thus can not be written. To write to the laminated media, heat is directed to the lower ferromagnetic layer to reduce its intrinsic coercivity below the magnetic field to which it is exposed. Because the upper ferromagnetic layer is also heated it is possible to use a material with a high K value for the upper layer, and thus the upper ferromagnetic layer can have an intrinsic coercivity which would prevent it from being written by a conventional write head if it were not heated.

The heater can be located close to or incorporated into the inductive write head and can be an electrically resistive heater or another heat source, such as a laser.

One of the ferromagnetic layers in the laminated media can be an antiferromagnetically coupled (AFC) structure that has two antiferromagnetically coupled ferromagnetic films separated by an antiferromagnetically coupling film.

For a fuller understanding of the nature and advantages of the present invention, reference should be made to the following detailed description taken together with the accompanying figures.

DETAILED DESCRIPTION OF THE INVENTION

Figure 1:
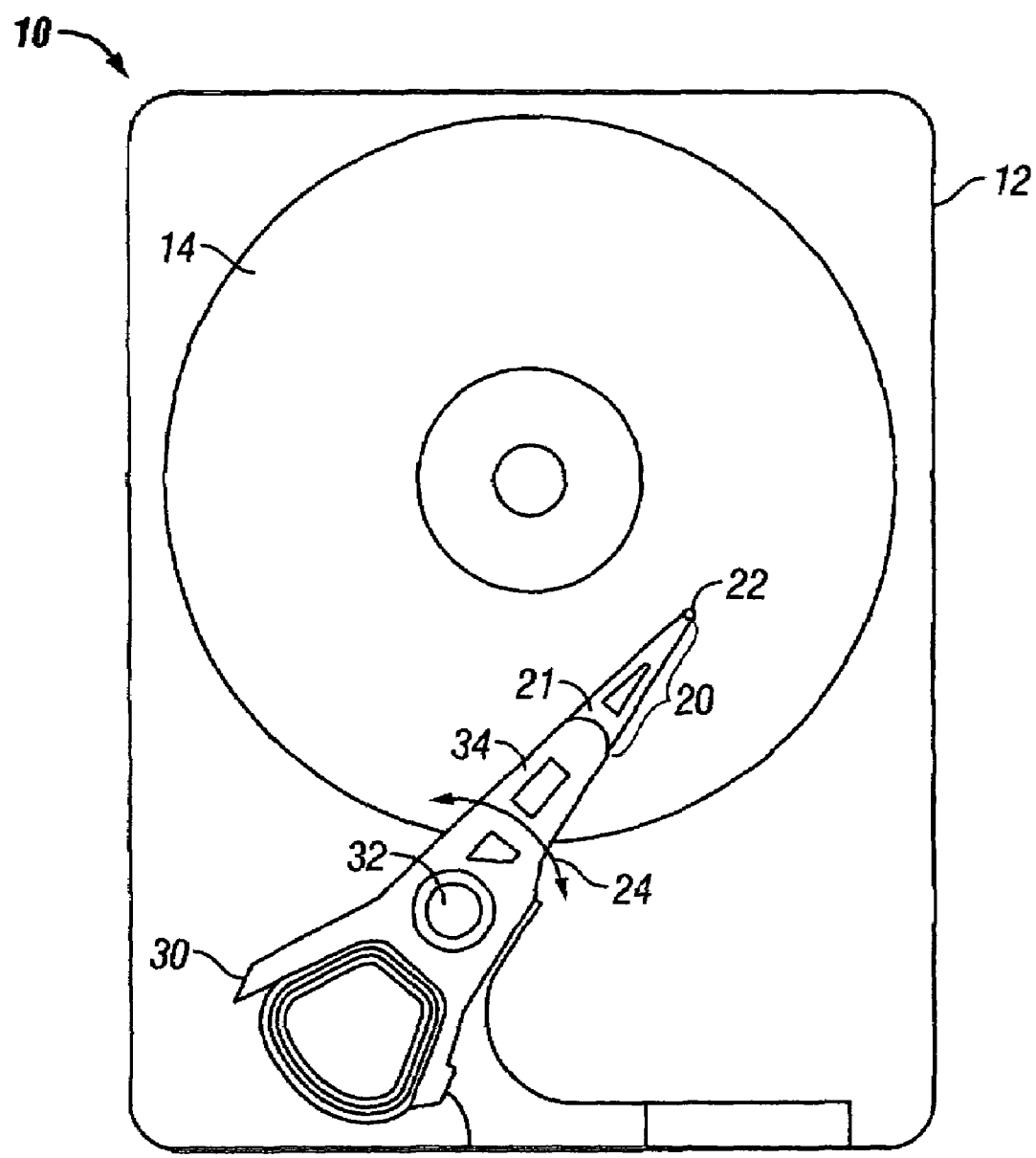
FIG. 1 is a top view of a disk drive according to the present invention with the cover removed.

FIG. 1 is a top view of a disk drive 10 according to the present invention with the cover removed. The drive 10 has a housing or base 12 that supports an actuator 30 and a drive motor for rotating magnetic recording disk 14 that has a laminated recording layer. The actuator 30 is typically a voice coil motor (VCM) rotary actuator that has a rigid arm 34 and rotates about pivot 32 as shown by arrow 24. A head-suspension assembly 20 includes a suspension 21 that has one end attached to the end of actuator arm 34 and a head carrier, typically slider 22, attached to the other end of suspension 21. As the disk 14 rotates, the movement of actuator 30 allows the head on the trailing end of head carrier 22 to access different data tracks on disk 14 for the recording and reading of data. The head structure located on the slider 22 includes an inductive write head, a magnetoresistive read head and means for heating the laminated recording layer while the write field is being applied.

Figure 2B:
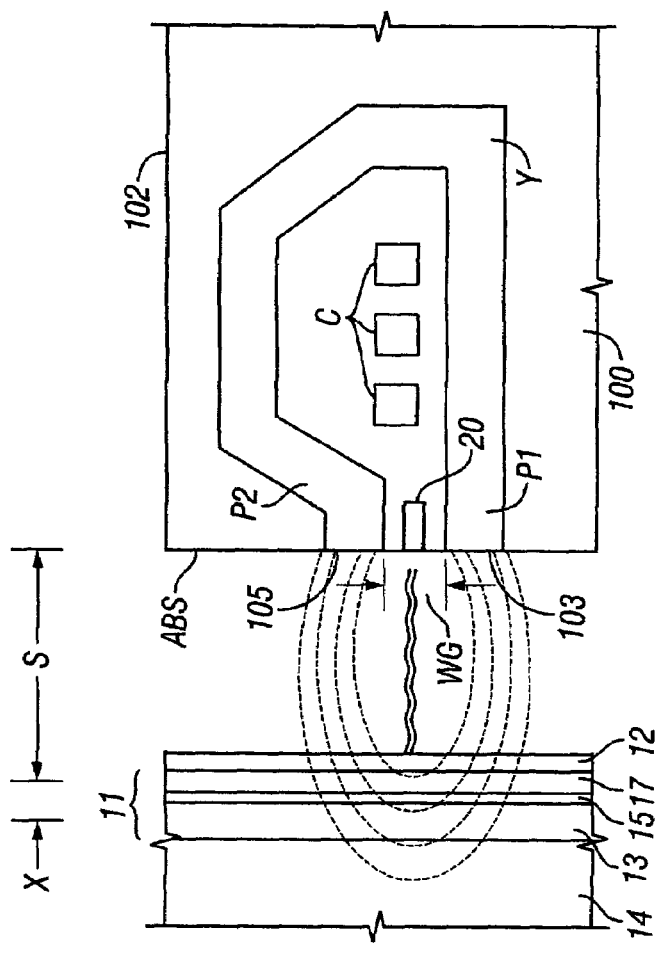
FIG. 2B is a sectional view of the head structure of FIG. 2A and the disk with the laminated recording layer, illustrating the magnetic write fields and the heat flux from the head structure.
Figure 2A:
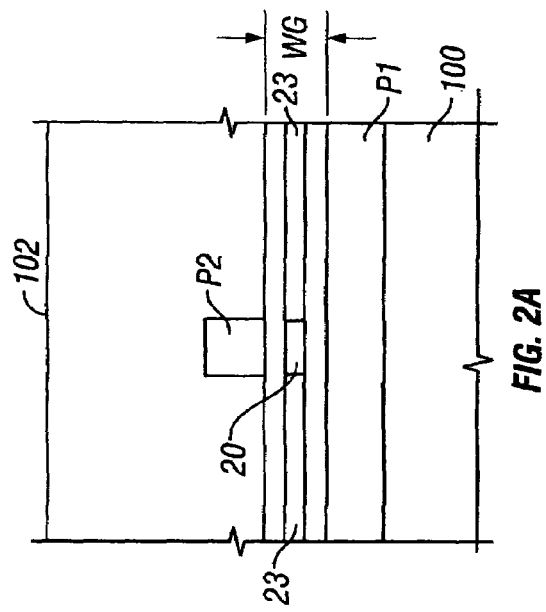
FIG. 2A is a view from the air-bearing surface (ABS) of the head structure used in the disk drive of the present invention illustrating the inductive write poles and the electrically resistive heater.

FIGS. 2A–2B illustrate a portion of a head as described in U.S. Pat. No. 6,493,183 that includes an inductive portion for generating the magnetic write field and a heater for heating the media. The inductive portion of the head includes yoke Y and coil C (the segments of coil C are shown in sectional view in FIG. 2B). The head is mounted on the trailing end 102 of a head carrier, such as an air-bearing slider 100. As write current is passed through the coil C, a magnetic field is produced in the write gap WG between two magnetic poles P1 and P2, as shown in FIG. 2A where the write head pole tips 103, 105 are viewed from the slider's air-bearing surface (ABS) directly above the disk 14. FIG. 2B also shows a section of a disk 14 facing the ABS and having a laminated magnetic recording layer 11 located beneath a protective overcoat 12. The laminated recording layer 11 includes lower or bottom ferromagnetic layer 13, nonmagnetic spacer layer 15, and upper or top ferromagnetic layer 17. In this head the heating device is an electrically resistive heater 20 built into the write gap WG between the poles P1, P2. FIG. 2A shows the electrical leads 23 connected to heater 20. The leads 23 are formed of a material that is a good electrical and thermal conductor, such as copper, rhodium or gold. The close proximity of the heater 20 to the disk 14 allows a region of the laminated magnetic layer 11 to be heated (as depicted by the wavy lines in FIG. 2B) while the data bit is being recorded in that region by exposure to the magnetic field (as depicted by dashed the dashed lines in FIG. 2B) generated between the pole tips 103, 105. As the disk 14 rotates beneath the head, the magnetic layer 11 cools and both ferromagnetic layers 13, 17 retain the direction of magnetization from the magnetic write field. Thus if the parallel magnetizations of the ferromagnetic layers 13, 17 in this region were in a direction opposite to the applied write field, they have now been reversed. Although FIGS. 2A–2B show the heater 20 located in the write gap WG, the heater may also be located outside the write gap, for example above pole P2 or below P1 in FIG. 2A. Also, the heater may be formed as part of the coil C, as described in published U.S. patent application 2003/0021191A1, in which case portions of the coil serve as the electrical leads to the heater. In addition, the heater does not need to be an electrically resistive heater and may be a separate element not directly associated with the inductive write head, such as a laser that directs a light spot to the media.

Figure 3:
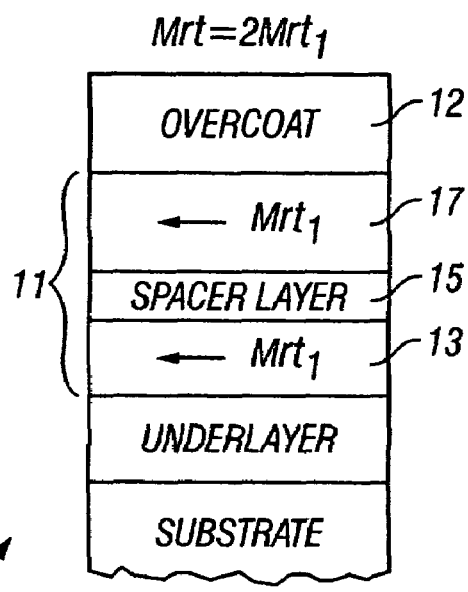
FIG. 3 is a schematic sectional view of a disk structure with a laminated magnetic recording layer.

FIG. 3 is a more detailed view of the disk 14 with the laminated magnetic recording layer 11 and also shows the substrate (typically an AlMg alloy with a surface coating or glass) and a conventional underlayer for enhancing the growth of the magnetic recording layer 11. The layer 11 comprises at least two individual magnetic layers 13, 17, each with a magnetic moment (per unit area) of $Mrt_1$, where two neighboring layers are separated by a nonferromagnetic spacer layer 15. This composite structure has a total $Mrt=2Mrt_1$, for a two-layer laminate. In this example all ferromagnetic layers have the same composition, so that Mr is the same. However, different ferromagnetic materials and thicknesses may be used, in which case the total magnetic moment would be given by $Mr_1t_1+Mr_2t_2$ for the structure of FIG. 3. As shown by the arrows in FIG. 3, the magnetizations of the two ferromagnetic layers 13, 17 are parallel to one another in each magnetized state.

The use of the recording layer structure of FIG. 3, which doubles the number of grains per unit area, has shown a 3 dB improvement in media SNR. However, this large improvement in media SNR in a conventional disk drive comes with a significant penalty in writability, which manifests itself in poor OW values. For the full 3 dB gain in SNR, the OW can be as much as 6 dB less than that compared to a conventional non-laminated recording layer. In measuring OW a low frequency square wave signal is written on the media. The amplitude of this signal is measured on a spectrum analyzer. This signal is then overwritten with a second square wave signal at six times the frequency of the original signal. The spectrum analyzer then measures the amplitude of the signal remaining from the original signal. OW is defined as the ratio of the amplitude of the original low frequency signal to the amplitude of the remaining low frequency signal after it has been overwritten by the higher frequency signal. OW is measured in units of dB which is 20 log (of the above ratio). The absolute value of this number is used.

Figure 4:
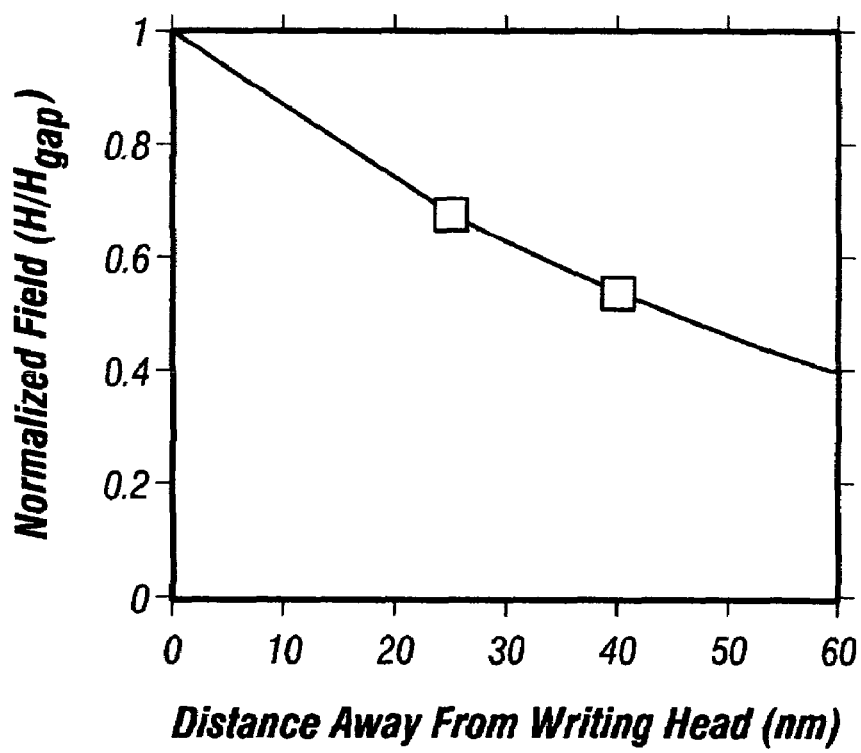
FIG. 4 is a graph of normalized write field from the inductive write head as a function of distance from the head pole tips.

Unlike in TAMR, where the inability to write is due to the high K value of the recording layer, in the laminated media structure the ferromagnetic materials have an anisotropy K value and thus an intrinsic coercivity capable of being written. However, the poor writability is because the lower magnetic layer in the laminated recording layer is exposed to a much lower field from the write head. The typical write head field profile as a function of vertical spacing of the recording layer from the write head pole tips is shown in FIG. 4 for an inductive write head with a 100 nm write gap and a 100 nm wide write head. The field at the middle of each of the magnetic layers 13, 17 in a two-layer laminated recording layer 11 is marked by the solid squares. The field at the middle of the bottom magnetic layer 13 is 20% lower than the field at the center of the top magnetic layer 15, illustrating the difficulties in writing the bottom magnetic layer 13. For smaller track widths needed for areal densities beyond 100 Gbits/inch$^2$ this problem will become more severe and will prevent the applicability of laminated media to high areal density disk drives.

As shown in FIG. 2B, the top ferromagnetic layer 17 is at a distance S from the pole tips 103, 105, where S is measured from the middle of the ferromagnetic layer 17, and the bottom ferromagnetic layer 13 is at a distance S+X from the pole tips 103, 105, where S+X is measured from the middle of the ferromagnefic layer 13. The write head is a conventional write head and the pole tips 103, 105 are typically formed of CoFe or a CoFe alloy and generate a write field of approximately 9 kOe at a distance S of approximately 25 nm. Both ferromagnetic layers are typically formed of a conventional granular CoPt alloy, such as CoPtCrB, with $H_0$ of approximately 8 kOe, which is low enough to enable the conventional write head to write, i.e., alter the magnetization, at a distance S=25 mn from the pole tips 103, 105. However, the write field from the head at 40 nm (S+X) is only approximately 7.2 kOe, which is less than the intrinsic coercivity of bottom ferromagnetic layer 13, and thus insufficient to alter the magnetization in layer 13.

Figure 5:
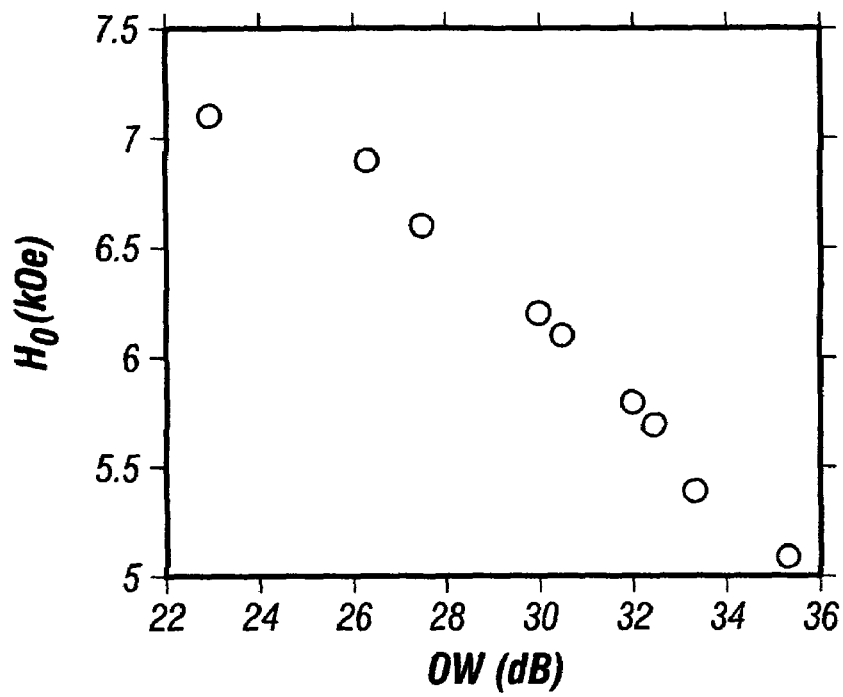
FIG. 5 is a graph of $H_0$ of a CoPtCrB alloy magnetic recording layer as a function of overwrite (OW) in dB.

In the present invention the ability to write the lower magnetic layer is improved by heating the laminated recording layer. The application of heat reduces $H_0$ of the lower magnetic layer without impacting the SNR gain. At the elevated temperature the $H_0$ of both magnetic layers is reduced, enabling the OW to be improved significantly. For a typical CoPtCrB alloy magnetic layer, the temperature dependence of the $H_0$ value is approximately 15 Oe/° C., which corresponds to a 1500 Oe decrease for a 100° C. temperature rise, or about a 20% reduction. FIG. 5 shows the dependence of OW as a function of $H_0$. This figure shows that a 100° C. temperature rise, corresponding to a 1500 Oe decrease in $H_0$, will yield an improvement in OW of approximately 9 dB. This significant improvement allows the laminated recording layer to have comparable OW values to a single magnetic layer, thereby removing a key limitation of implementing laminated recording layers in disk drives.

An additional aspect of the present invention wherein heat is applied to the laminated recording layer is the use of a laminated recording layer with the top or upper magnetic layer formed of a high K material. This leads to improved thermal stability that can be used to reduce the thickness of the upper magnetic layer, which results in a reduction in the magnetic spacing between the write head and the lower magnetic layer. This further improves the writability of the lower layer and therefore the OW. Thus the top magnetic layer can be formed of material with a higher K, such as a CoPt alloy with a relatively high Pt content, that thus has a higher value of $H_0$. For example, the top magnetic layer can be formed of a CoPtCrB alloy with Pt of 16 atomic percent, which has an intrinsic coercivity of approximately 10 kOe. This value of $H_0$ is higher than the write field that a conventional write head can generate at the distance S. However, when this lower magnetic layer is heated to approximately 100° C. its intrinsic coercivity is lowered to approximately 8.5 kOe.

Figure 6:
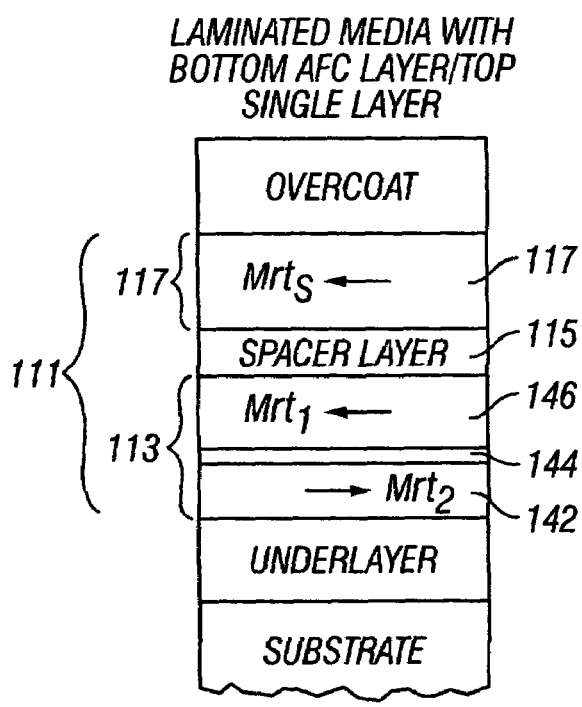
FIG. 6 is a schematic sectional view of an alternative disk structure with an antiferromagnetically coupled (AFC) layer as the bottom layer in a laminated magnetic recording layer.

As shown in FIG. 6, the disk drive according to the present invention is also applicable with a laminated antiferromagnetic recording layer 111, as described in pending application US2002/0098390. In this structure the bottom magnetic layer 113 of the laminated recording layer 111 is an antiferromagnetically coupled (AFC) structure, as described in U.S. Pat. No. 6,280,813, and includes two antiferromagnetically coupled films 142, 146 separated by an antiferromagnetically coupling film 144. The top magnetic layer 117 is separated from AFC layer 113 by nonmagnetic spacer layer 115. The upper ferromagnetic film 146 has an $Mrt_1$ greater than the $Mrt_2$ of the lower ferromagnetic film 144. Alternatively, the AFC layer 113 may be the upper magnetic layer and the single magnetic layer 117 the lower magnetic layer in the laminated recording layer 111. As shown by the arrows in FIG. 6, the magnetization of upper layer 117 and the net magnetization of AFC layer 113 are parallel in each magnetized state.

While only a two-magnetic-layer laminated structure is depicted in FIGS. 3 and 6, the disk drive according to the preset invention is applicable with laminated media that may have two or more AFC layers and two or more single magnetic layers, with nonferromagnetic spacer layers located between the neighboring magnetic layers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for recording in a disk drive having an inductive write head and a magnetic recording disk, the method comprising:

providing a magnetic recording disk with a laminated layer having a lower ferromagnetic layer, an upper ferromagnetic layer and a nonferromagnetic spacer layer between the lower and upper ferromagnetic layers, the magnetizations of the lower and upper ferromagnetic layers being parallel in a first direction in a region of the laminated layer;

directing a magnetic field from the write head to said region of the laminated layer, the strength of said field at the middle of the upper ferromagnetic layer being greater than the intrinsic coercivity of the upper ferromagnetic layer, whereby the magnetization direction in the upper ferromagnetic layer is reversed by said field, and the strength of said field at the middle of the lower ferromagnetic layer being less than the intrinsic coercivity of the lower ferromagnetic layer; and heating the lower ferromagnetic layer in the presence of the magnetic field to lower its intrinsic coercivity to thereby enable reversal of the magnetization direction in the lower ferromagnetic layer by said field, whereby the magnetizations of the lower and upper ferromagnetic layers are parallel in a second direction opposite said first direction in said region.

2. The method of claim 1 wherein providing a magnetic recording disk comprises providing a disk with an antiferromagnetically coupled (AFC) layer as the lower ferromagnetic layer, the AFC layer comprising a first ferromagnetic film, a second ferromagnetic film and an antiferromagnetically coupling film located between the first and second ferromagnetic films and having a thickness and composition to provide antiferromagnetic exchange coupling of the first and second ferromagnetic films.

3. The method of claim 1 wherein heating comprises directing heat from an electrically resistive heater.

4. The method of claim 1 wherein heating comprises directing heat from a laser.

5. The method of claim 1 wherein providing a magnetic recording disk comprises providing a disk wherein the upper ferromagnetic layer is formed of a material having an intrinsic coercivity substantially higher than the intrinsic coercivity of the lower ferromagnetic layer.

* * * * *